United States Patent Office 3,197,447
Patented July 27, 1965

3,197,447
POLYMERS AND COPOLYMERS OF
ACETALS OF ALLYL ALCOHOL
Pierre Talet, Alfortville, France, assignor to Nobel-Bozel, Paris, France, a joint-stock company of France
No Drawing. Filed Nov. 6, 1961, Ser. No. 152,119
Claims priority, application France Nov. 26, 1960, 845,126
9 Claims. (Cl. 260—80)

The present invention relates, by way of new industrial products to monomeric acetals derived from allyl alcohol and to their polymers. More specifically, the allyl alcohol acetals according to the invention are obtained from glyoxal and glyoxylic acid.

The present invention also provides a process for manufacturing such monomers and their polymers. It further relates to industrial applications of these new compounds.

According to the invention allyl alcohol is reacted, under conditions favourable to acetalization, with glyoxal or with glyoxylic acid. More specifically at least a stoichiometric amount of allyl alcohol, and preferably an amount substantially in excess of said stoichiometric amount, is used for the reaction.

The present invention also provides a process for polymerizing allyl monomers derived from glyoxal or from glyoxylic acid; it also provides for the copolymerization of these two types of monomers or the copolymerization of these monomers with another polymerizable unsaturated compound.

The process for obtaining these monomers simply comprises putting the reactants into contact with each other under the above mentioned conditions and heating the reaction medium while azeotropically removing the water which is formed during the reaction.

The polymerization or copolymerization of these monomers can be carried out in bulk, in solution or in emulsion, with or without a catalyst, and at relatively low temperatures.

In accordance with other features of these polymerization or copolymerization processes, they may be carried out at room temperature.

According to a further feature, they can be carried out in the presence of gaseous oxygen.

The polymers or copolymers of the invention are very interesting as concerns the field of protective coatings for their application to dyes, varnishes, fabric impregnation, etc.

These polymers and copolymers are particularly characterized by their insolubility in the usual solvents, their flexibility, as well as by their good mechanical strength, high resistance to chemical attack and good properties of adhesion to supports onto which they may be applied.

Other features and advantages of the invention will become more apparent from the following description.

The monomers forming the subject-matter of the invention are represented generally by the formula:

$$CH_2=CH-CH_2-O \diagdown \diagup O-CH_2-CH=CH_2$$
$$\phantom{CH_2=CH-CH_2-O}a-C-CH$$
$$\phantom{CH_2=CH-CH_2-O}b \diagup \diagdown O-CH_2-CH=CH_2$$

wherein the two free valences $a$ and $b$ can be saturated either by a monovalent radical and a monovalent element, such as the radical $CH_2=CH-CH_2-O-$ and the hydrogen element $H-$, or by a bivalent element, in particular oxygen $O=$.

In the case of the derivative resulting from the reaction of allyl alcohol with glyoxal, the monomer obtained is represented by the formula:

$$CH_2=CH-CH_2-O \diagdown \diagup O-CH_2=CH_2$$
$$\phantom{CH_2=CH-CH_2-O}CH-CH$$
$$CH_2=CH-CH_2-O \diagup \diagdown O-CH_2-CH=CH_2$$

This product is glyoxal-tetra-allylacetal, which will be designated hereafter as "G.T.A."

This new compound is a colorless liquid distilling at from 155 to 160° C. under 25–30 mm. mercury.

In the case of the derivative resulting from the reaction of allyl alcohol with glyoxylic acid, this is represented by the formula:

$$CH_2=CH-CH_2-OCO-CH \diagdown \diagup O-CH_2-CH=CH_2$$
$$\phantom{CH_2=CH-CH_2-OCO-CH} \diagdown O-CH_2-CH=CH_2$$

This product is allylester-diallylacetal of glyoxylic acid designated hereafter as "A.D.G.A."

This new compound is a colourless liquid having a boiling point of 155° C. under 42 mm. mercury.

The two following examples are given merely by way of illustration and relate to the preparation of the two particular compounds defined hereabove:

EXAMPLE A

Preparation of G.T.A.

The following were placed in a five-litre flask having a mechanical stirrer, a thermometer and azeotropic distillation apparatus:

(1) 360 gm. of an aqueous solution containing 40% glyoxal (corresponding to about 140 gm. of pure glyoxal, about 2.5 moles);
(2) 1 kgm. of allyl alcohol (580 gm. or 10 moles+ excess);
(3) 1 kgm. of benzene;
(4) 8 gm. of $H_2SO_4$ (66° Bé.).

The water formed was heated and distilled azeotropically. The composition of the azeotrope, which passes at 68°, was as follows.

Upper layer (92%): | Percent
---|---
Alcohol | 8.4
Benzene | 91.1
$H_2O$ | 0.5
Lower layer (8%): |
Alcohol | 17.5
Benzene | 0.2
$H_2O$ | 82.0

The reaction was stopped when there was no more formation of water; this occurred after 6 hours 20 minutes. The internal temperature, which was initially 73° C., reached 82.5° C. at the end of the reaction.

A small amount of sodium acetate was then added, the mixture was stirred and the benzene and the excess of allyl alcohol were distilled under normal pressure. 1.1 kgm. containing 250 gm. of allyl alcohol was collected. This mixture can be recycled. Thereafter a vacuum fractioning was effected. The "G.T.A." passes at 155° C.–160° C. under 25 mm. mercury.

Yield: 520 gm. (82% with respect to theory).

Instead of using the aqueous solution containing 40% glyoxal, it is possible to start from the powdered product at 78%, thus increasing the speed of the reaction.

EXAMPLE B

Preparation of A.D.G.A.

The following were placed in a five-litre flask having a mechanical stirrer, a thermometer and azeotropic distillation apparatus:

500 gm. of 60% solution of glyoxylic acid (4 gm.-mole);
1.5 kgm. allyl alcohol;
1.6 kgm. benzene;
8 gm. $H_2SO_4$ (66° Bé.).

The water formed was heated and distilled azeotropically. The reaction was stopped when there was no more formation of water which occurred after 13 hours. The internal temperature, which was initially 72° C., rose to 81° C. at the end of the reaction. A small amount of sodium acetate was added and the benzene and the excess of allyl alcohol were distilled at normal pressure. 2.6 kgm. containing 700 gm. of allyl alcohol was obtained. The mixture can be recycled. The A.D.G.A. passes at 155° C. under 42 mm. mercury.

Yield: 583 gm. (70% with respect to theory).

The monomers thus obtained which are unsaturated in character can be converted according to the invention into polymers or copolymers. More specifically, these polymers or copolymers which may be obtained are characterized in that they can give rise to two dimensional networks and to three dimensional networks.

The methods of polymerization resulting in such polymers are generally based on two different principles.

The first of these principles involves introducing one or more monomers having more than one polymerizable double bond into the monomer or monomers bearing a polymerizable double bond.

The second principle involves forming firstly a linear chain in which figure chemically reactive groups. This prepolymer has a cross-linking agent added thereto having in the molecule at least two functions capable of reacting with the active groups of the prepolymer.

The two aforesaid allyl derivatives constitute excellent cross-linking agents which conform with the first principle.

But, in most cases, copolymerization by monomers bearing several reactive double bonds results prematurely in the formation of a three-dimensional macromolecule, insoluble in solvents, difficult to melt and thus difficult to use. On the other hand the second principle is more practical in use.

The allyl derivatives forming the subject-matter of the invention also enable advantage to be taken of the processes based on the second principle, that is to say the possibility of initiating the cross-linking at a time when it is no longer objectionable.

In effect these two unsaturated derivatives are apt to polymerize or copolymerize, but the allyl groups present on the same molecule only take part in the polymerization successively. It is, therefore, possible to use firstly a single allyl group and consequently obtain a two-dimensional linear macromolecule, accordingly conserving the properties of solubility which are often indispensable in use.

A subsequent, more energetic, treatment which consists of adding a catalyst or increasing the temperature enables the double bonds remaining free to form cross-links between the chains, this being necessary for ensuring insolubility in conventional solvents, improvement in resistance to attack by various chemicals, good weathering, etc.

Even slight cross-linking is often sufficient to take away stickiness to the touch of films and organic polymer based coatings.

Moreover the cross-links are often too rigid to conserve flexibility, which is sometimes necessary in the films after cross-linking. However, in this case the links between the chains are formed by bridges containing a succession of at least 5, and more often 13, atoms as shown in the following Diagrams I and II put forward by the applicant as a partial and purely hypothetic explanation of the phenomena and which have, naturally, no implied restriction on the scope of this invention:

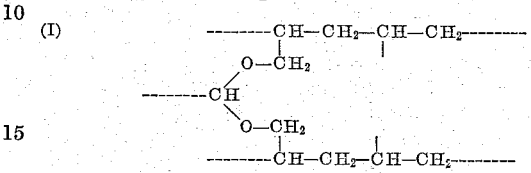

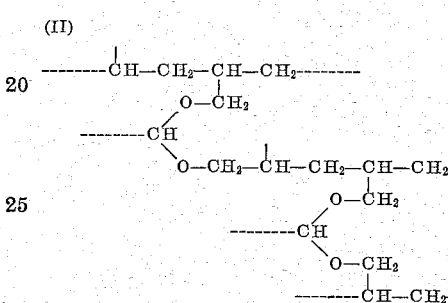

These bridges, formed by a succession of numerous atoms with little steric impediment to disturb free rotation, give to the entire structure a high resistance to solvents and heat since the long chains of the high polymer cannot be dissociated without breaking the main valences, but retain a certain amount of flexibility as a relative amount of freedom is left for the chains to displace with respect to one another.

The result is that, sometimes, despite the setting-up of cross-linking the resulting resin is more flexible than it would have been had no polyallyl derivatives been added. Should this be the case the internal plastification is absolutely permanent.

The few examples which follow, given without any intention of limitation, illustrate certain possibilities for application of these new polymerizable monomers.

EXAMPLE 1

Bulk polymerization of G.T.A.

This bulk polymerization can be effected in the presence of a catalyst. Amongst suitable catalysts are organic peroxides and hydroperoxides, and in particular tertiary butyl peroxide $((CH_3)_3C$—$O$—$O$—$C$—$(CH_3)_3)$ which are the most active.

If the following mixture is heated to 160°C:

|  | Gm. |
|---|---|
| G.T.A. | 50 |
| Tertiary butyl peroxide | 1 | a resin, which is of high viscosity when cold and has a fairly strong surface film, is obtained after 75 minutes.

Benzoyl peroxide of formula:

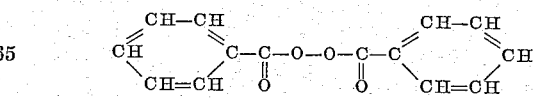

and cyclohexanone peroxide, which can be considered as a mixture of the compounds represented by the formulae:

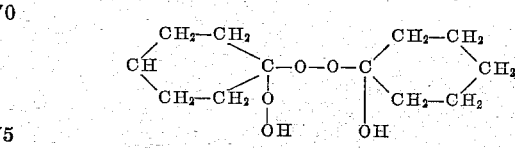

$$\underset{CH_2-CH_2}{\overset{CH_2-CH_2}{\diagup}}CH_2\diagdown\underset{\overset{|}{OH}}{\overset{}{C}}-O-O-\underset{\overset{|}{OH}}{\overset{}{C}}\diagup\underset{CH_2-CH_2}{\overset{CH_2-CH_2}{\diagdown}}CH_2$$

only cause a slight increase in viscosity after the same time and under the same conditions.

Oxygen can have an influence on the polymerization under consideration. In order to show this influence clearly and, in particular, that of oxygen in the air, samples of monomers treated in the prescence of these various peroxides were spread in thin layers on steel sheeting. After being stoved for 15 minutes at 160°C, and irrespective of the particular peroxide or hydroperoxide catalyst used, all of the resulting films gave an adherent and coloured varnish, of hardness 7H to 8H. This hardness corresponds to that of pencils normally used in the paint and varnish industry (see for example: "La Chimie de Peintures," February 1957, page 71).

This bulk polymerization of G.T.A. can also and advantageously be carried out by means of simple heat treatment. To this end G.T.A., free from a radicalar or other catalyst, was deposited in a steel plate; this plate was stoved for 20 minutes at 160°C. The resultant film is a hard, substantially colourless varnish, having a high resistance to water and to usual solvents.

Contrary to what is observed in the case of conventional polymerizable monomers, such as vinyl, acryl and the like monomers, the above example shows that gaseous oxygen is very favourable to the polymerization of the monomers according to the invention; this favourable effect is particularly unusual in the case of conventional polymerizable monomers. This consequently shows the high value of the monomers of the invention, in the field of protective coatings such as in the production of paints, varnishes, lacquers, etc.

EXAMPLE 2

*Bulk polymerization of A.D.G.A.*

A.D.G.A. is polymerized in the prescence of diffierent catalysts. The catalysts selected for each polymerization were:

Lauryl peroxide of formula $$CH_3-(CH_2)_{10}-\underset{\overset{\|}{O}}{C}-O-O-\underset{\overset{\|}{O}}{C}-(CH_2)_{10}-CH_3$$

Cyclohexanone peroxide of formula as already given;
Tertiary butyl perbenzoate of formula $$\underset{CH-CH}{\overset{CH-CH}{\diagup}}CH\diagdown\underset{}{\overset{}{C}}-\underset{\overset{\|}{O}}{C}-O-O-C(CH_3)_3$$

Benzoyl peroxide of formula as already given;
Tertiary butyl hydroperoxide of formula
$$(CH_3)_3C-O-OH$$
and tertiary butyl peroxide of formula as already given.

After one hour of heat treatment at 160°C, only a small change was observed in the viscosity of the product. After two hours, it was observed that it was the sample treated with hydro-peroxide or tertiary butyl peroxide which had the highest viscosity.

The colouration of the polymers obtained varied from very light yellow to dark yellow according to the catalyst used.

In all cases it was observed that polymerization occurs at a slower rate than that in the bulk polymerization of B.T.A.

If a thin layer of A.D.G.A. in the prescence of one of the aforesaid catalysts is spread on a steel plate, it is observed that a certain amount of monomer (non-polymerized) starts evaporating under the action of a heat treatment at 170°, but that after one hour of treatment at this temperature a film of relatively dark yellow is obtained finally. The hardness of this film is less than that obtained in the corresponding test, according to Example 1, with G.T.A. This hardness corresponds to pencils 6H–7H.

In a test corresponding to that which was made to show the influence of oxygen in the air which test comprised spreading the monomer in the absence of a catalyst on a steel plate, the film ultimately obtained by heat treatment is of the same hardness as above but is free from colouration.

EXAMPLE 3

*Ethyl acrylate-G.T.A. copolymers prepared at room temperature*

A series of tests were made with increasing proportions of allyl derivative in order to copolymerize G.T.A. with, for example, ethyl acrylate. The following Table I gives the formulae as well as the results observed.

TABLE I.—COPOLYMERIZATION OF G.T.A. AT ROOM TEMPERATURE

| Test No. | 1 | 2 | 3 | 4 | 5 | 6 |
|---|---|---|---|---|---|---|
| Ethyl acrylate | 100 gm | 100 gm | 100 gm | 100 gm | 100 gm | 100 gm. |
| Aniline dimethyl | 0.1 gm | 0.1 gm | 0.1 gm | 0.1 gm | 0.1 gm | 0.1 gm. |
| Benzoyl peroxide | 2.5 gm | 0.1 gm | 0.1 gm | 0.1 gm | 0.1 gm | 0.1 gm. |
| Glyoxal tetra-allyl (G.T.A.) | 0 cc | 5.0 cc | 10.0 cc | 15.0 cc | 20.0 cc | 25.0 cc. |
| Reaction at room temperature | Very slight | Slight | Slight | Strong | Strong | Strong. |
| Consistency | Viscous liquid | Viscous liquid | Viscous liquid | Gel | Soft flexible solid. | Soft flexible solid. |
| Acetone solubility | Soluble | Soluble | Soluble | Suspension | Insoluble | Insoluble. |

It will be seen that the more the proportion of allyl derivative is increased the higher is the consistency of the copolymer and the smaller is its solubility.

Similar results are achieved with methyl acrylate, butyl acrylate, methyl methacrylate, ethyl methacrylate, butyl methacrylate, vinyl acetate, styrene, etc.

EXAMPLE 4

*Ethyl acrylate-G.T.A. copolymers at 100° C.*

In this example, a copolymerization test was conducted at a relatively high temperature between G.T.A. and ethyl acrylate.

The test was carried out as follows:

100 gm. ethyl acrylate
15 gm. of G.T.A.
2 gm. of benzoyl peroxide were mixed together.

A water-bath was used to raise the temperature to 100° C. and a control sample without G.T.A. was placed next to it in the same water-bath.

After two hours, the control sample was polymerized into a sticky soft resin, whereas the copolymer sample gave a non-sticky flexible resin.

In this case copolymerization has increased the consistency and, which is important for numerous applications, eliminated the surface stickiness.

EXAMPLE 5

*Ethyl acrylate-G.T.A. copolymerization at 100° C. in the presence of a solvent*

This test was effected with a view to the copolymerization of ethyl acrylate and G.T.A. using heat treatment, a catalyst and a solvent together.

To this end, the reactants were mixed in the following proportions:

|  | Gm. |
|---|---|
| Ethyl acrylate | 100 |
| G.T.A. | 20 |
| Ethyl acetate (solvent) | 250 |
| Benzoyl peroxide | 2.5 |

After 15 minutes in a water bath at 100° C., a gel is obtained.

The same happens when the ethyl acetate is replaced by acetone, benzene, or butanol. On the other hand, trichloro-ethylene gives a true solution.

This example confirms the introduction of polyallyl-monomers into the macromolecular network to prevent the latter from being dissolved in the solvent.

EXAMPLE 6

*Emulsion copolymerization of acrylates with G.T.A.*

The following test is intended to show that, due to the monomers of the invention, it is possible to obtain an emulsion giving films and coatings having excellent properties.

The following were placed in a one-litre flask having a stirrer and a reflux condenser:

|  | Gm. |
|---|---|
| Distilled water | 230 |
| 20% sulfonated lauric alcohol in solution in water | 6 |
| The condensation product of oleic alcohol with ethylene oxide | 8 |

Thereafter 25% of the following mixture:

|  | Gm. |
|---|---|
| Ethyl acrylate | 115 |
| Methyl methacrylate | 80 |
| G.T.A. | 5 |

When the whole reached 77° C., a 1.2% potassium persulfate solution in water was added. The polymerization was initiated and the remainder of the former mixture was poured. Finally, temperature is brought to 88° C.–89° C. cooled and neutralized to a pH of 7.6.

The emulsion which is obtained has a concentration of 41%. When spread on steel sheeting, it gives a transparent plastic film, slightly soluble in trichloroethylene. By stoving at 180° C. the hardness increases to between 8H and 9H and the film becomes insoluble in trichloro-ethylene.

When applied to a cotton fabric by impregnation, squeezing between rollers and drying at 80° C., this emulsion deposits 84 gm. of dry resin per sq. metre. After treatment at 130° C. a semi-rigid primer is obtained which resists prolonged exposure to trichloroethylene and withstands several washings with water at 25° C. containing 2.5 gm. soap per litre.

EXAMPLE 7

*Variant of copolymerization in emulsion of acrylates with G.T.A.*

The following mixture of monomers was copolymerized under the same conditions as in Example 6:

|  | Gm. |
|---|---|
| Ethyl acrylate | 110 |
| Methyl methacrylate | 80 |
| Acrylamide | 5 |
| G.T.A. | 5 |
| Water | 230 |

The emulsion thus obtained was deposited on glass and gave an adhering, hard, glossy film.

A cotton fabric impregnated with 130 gm./sq. metre (dry weight) of this resin gave, after heating at 130° C., a less rigid fabric than that of Example 6, which also resisted prolonged exposure to trichloroethylene; it withstands numerous washings with water containing 2.5 gm. of soap per litre.

If 5% of 40% formol is added to the above emulsion, the insolubility is further increased and the initial colouration of the fabric is better preserved.

EXAMPLE 8

*Polymerization of A.D.G.A. in the presence of tin tetrachloride at room temperature*

10 gm. of tin tetrachloride were added to 100 gm. of A.D.G.A.; it was found that the temperature raised and the mixture thickened.

With a concentration of 25 gm. of tetrachloride a hard and strongly coloured resin resulted.

EXAMPLE 9

*Ethyl acrylate-A.D.G.A. copolymers prepared at room temperature*

As in Example 3, a series of tests were carried out with increasing proportions of allyl derivative with a view to the copolymerization of A.D.G.A. with, for example, ethyl acrylate.

The following Table II gives both the formulae and the results observed.

TABLE II.—COPLYMERIZATION OF ACETAL ESTERS AT ROOM TEMPERATURE

| Test No. | 1 | 2 | 3 | 4 | 5 | 6 |
|---|---|---|---|---|---|---|
| Ethyl acrylate | 20 cc | | | | | |
| Aniline dimethyl | 0.5 gm | 0.5 gm | 0.5 gm | 0.5 gm | 0.5 gm | 0.5 gm. |
| Benzoyl peroxide | 500 mg | | | | | |
| A.D.G.A. | 0 gm | 1 gm | 2 gm | 3 gm | 4 gm | 5 gm. |
| Raise in temperature (reagents being present) | Slight | Large (boiling) | Large (boiling) | Large (boiling) | Large (boiling) | Large (boiling). |
| Acetone solubility | Solid | Gel | Insoluble | Insoluble | Insoluble | Insoluble. |
| Coloration | Light maroon | Light maroon | Light maroon | Light maroon | Light maroon | Light maroon. |
| Consistency | Thick syrup | Thick syrup | Solid-soft-flexible | Solid-soft-flexible | Solid-soft-flexible | Solid-soft-flexible. |

As in the case of Example 3, it can be seen from this table that the more the proportion of allyl derivative is increased, the greater the consistency of the copolymer, and the smaller the solubility.

Similar results are obtained with methyl acrylate, butyl acrylate, methyl methacrylate, ethyl methacrylate, butyl methacrylate, vinyl acetate, styrene, etc.

EXAMPLE 10

*Ethyl acrylate—A.D.G.A. copolymers prepared at a high temperature*

In this example 100 gm. of ethyl acrylate were mixed with 2.5 gm. of benzoyl peroxide. Increasing amounts of A.D.G.A. were added and the water-bath was raised to 100° C.

With five parts of A.D.G.A. for 100 parts of ethyl acrylate an advanced polymerization was observed after five minutes yielding a colourless flexible, non-sticky polymer.

The final resin becomes less and less flexible up to about 20 parts of A.D.G.A. for 100 parts of acrylic ester.

EXAMPLE 11

*Ethyl acrylate-A.D.G.A. copolymerization in the presence of solvents*

In this example 100 gm. ethyl acrylate, 20 gm. of A.D.G.A., 2.5 gm. of benzoyl peroxide and 5 gm. of ethyl acetate (solvent) were mixed together.

After 15 minutes in a water-bath at 100° C., the sample gels.

The same happens if ethyl acetate is replaced by acetone, benzene, or butanol. On the other hand, trichloroethylene gives a solution which, when poured on a glass plate, forms a film. This film, after one hour of stoving at 160°, becomes insoluble in acetone.

EXAMPLE 12

*Emulsion copolymerization of ethyl acrylate and A.D.G.A.*

This example shows that it is possible to obtain an emulsion giving films which are insoluble in trichloroethylene.

The following were placed in a one-litre flask having a stirrer and a reflux condenser:

| | Gm. |
|---|---|
| Distilled water | 234 |
| 20% sulfonated lauric alcohol in aqueous solution | 5 |
| A condensation product of oleic alcohol with ethylene oxide | 4 |

Thereafter, 20% of the following mixture

| | Gm. |
|---|---|
| Ethyl acrylate | 190 |
| A.D.G.A. | 10 |

This mixture was polymerized in gradually adding an aqueous solution of 1.2% ammonium persulfate together with the rest of the mixture. Polymerization evolved at 80° C. and was completed at 87°–88° C.

When deposited on a glass plate, this emulsion gave, after the evaporation of water, a film of soft consistency, soluble in trichloroethylene which, after 15 minutes of stoving at 140° C. became insoluble in trichloroethylene while maintaining good flexibility.

Treated under the same conditions an emulsion of ethyl polyacrylate gives a more flexible film which remains entirely soluble in trichloroethylene, irrespective of the duration of stoving at 140° C.

EXAMPLE 13

*Vinyl acetate-G.T.A. copolymerization in the presence of a solvent*

This example shows that, due to the judiciously copolymerized monomers of the invention, it is possible to obtain a collodion which gives films having a high softening point and which are even infusible.

The following was placed in a 150 litre Grignard reactor having a reflux condenser:

| | Kgm. |
|---|---|
| Ethyl acetate | 50 |
| Vinly acetate | 50 |
| Benzoyl peroxide | 1 |
| G.T.A. | 0.5 |

Polymerization started at a temperature of 71° C. rising to 75–76° C. towards the end of the reaction.

When the viscous mass tended to assume a gel structure it was subjected to as rapid a cooling as possible. The total duration of polymerization was two hours.

The final collodion was transparent and colourless. The film spread on glass was perfectly clear, readily removable from the support and showed quite hard after stoving at 105° C. The softening point measured by means of a Maquenne block was 95° C. Such a high softening point is rather surprising considering that the viscosity of collodion is relatively low, taking concentration into account.

Without any cross-linking agent, such a softening point could only have been attained with very small amounts of catalyst, which would have resulted in a much longer polymerization time. The anomalies in the properties of this copolymer are, therefore, due to the presence of G.T.A.

The same test, repeated with twice the amount of G.T.A., required 2 hours 45 minutes for polymerization, the temperature being held between 70 and 73° C. This time the polymer can no longer be melted on the Maquenne block.

I claim:

1. Homopolymers produced by the polymerization of a polymerizable unsaturated monomer compound selected from the group consisting of:

$$CH_2=CH-CH_2-O \quad O-CH_2-CH=CH_2$$
$$HC-CH$$
$$CH_2=CH-CH_2-O \quad O-CH_2-CH=CH_2$$

and $$CH_2=CH-CH_2-O \quad O-CH_2-CH=CH_2$$
$$O=C-CH$$
$$O-CH_2-CH=CH_2$$

2. Copolymers produced by the polymerization of an admixture of at least one polymerizable unsaturated monomer compound selected from the group consisting of:

$$CH_2=CH-CH_2-O \quad O-CH_2-CH=CH_2$$
$$HC-CH$$
$$CH_2=CH-CH_2-O \quad O-CH_2-CH=CH_2$$

and $$CH_2=CH-CH_2-O \quad O-CH_2-CH=CH_2$$
$$O=C-CH$$
$$O-CH_2-CH=CH_2$$

and at least one polymerizable unsaturated monomer compound selected from the group consisting of methyl acrylate, ethyl acrylate, butyl acrylate, methyl methacrylate, ethyl methacrylate, butyl methacrylate, vinyl acetate and styrene.

3. A polymerizable unsaturated monomer compound selected from the group consisting of:

$$CH_2=CH-CH_2-O \quad O-CH_2-CH=CH_2$$
$$HC-CH$$
$$CH_2=CH-CH_2-O \quad O-CH_2-CH=CH_2$$

and $$CH_2=CH-CH_2-O \quad O-CH_2-CH=CH_2$$
$$O=C-CH$$
$$O-CH_2-CH=CH_2$$

4. Homopolymers produced by the polymerization of:

$$CH_2=CH-CH_2-O \quad O-CH_2-CH=CH_2$$
$$HC-CH$$
$$CH_2=CH-CH_2-O \quad O-CH_2-CH=CH_2$$

5. Homopolymers produced by the polymerization of:

$$CH_2=CH-CH_2-O \quad O-CH_2-CH=CH_2$$
$$O=C-CH$$
$$O-CH_2-CH=CH_2$$

6. Copolymers produced by the polymerization of:

$$CH_2=CH-CH_2-O \quad O-CH_2-CH=CH_2$$
$$HC-CH$$
$$CH_2=CH-CH_2-O \quad O-CH_2-CH=CH_2$$

and at least one polymerizable unsaturated monomer compound selected from the group consisting of methyl acrylate, ethyl acrylate, butyl acrylate, methyl menthacrylate, ethyl methacrylate, butyl methacrylate, vinyl acetate and styrene.

7. Copolymers produced by the polymerization of:

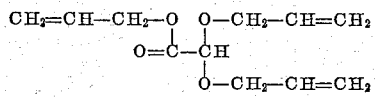

and at least one polymerizable unsaturated monomer compound selected from the group consisting of methyl acrylate, ethyl acrylate, butyl acrylate, methyl methacrylate, ethyl methacrylate, butyl methacrylate, vinyl acetate and styrene.

8. A polymerizable unsaturated monomer compound having the formula

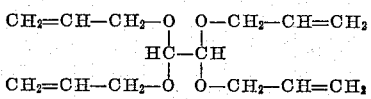

9. A polymerizable unsaturated monomer compound having the formula

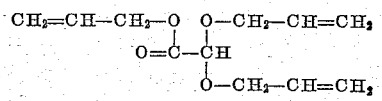

References Cited by the Examiner

UNITED STATES PATENTS 2,409,633  10/46  Kropa _____ 260—78.5
2,561,254  7/51  Whetstone et al. _____ 260—91.1

FOREIGN PATENTS 510,168  7/39  Great Britain.
599,362  2/42  Great Britain.

JOSEPH L. SCHOFER, *Primary Examiner.*

JOSEPH R. LIBERMAN, *Examiner.*